Sept. 19, 1933.  L. F. MORONEY  1,927,132

WHEEL GRIP FOR TRACTION WHEELS

Filed June 10, 1932  2 Sheets-Sheet 1

INVENTOR
L. F. MORONEY
BY
ATTY.

Sept. 19, 1933.   L. F. MORONEY   1,927,132
WHEEL GRIP FOR TRACTION WHEELS
Filed June 10, 1932   2 Sheets-Sheet 2
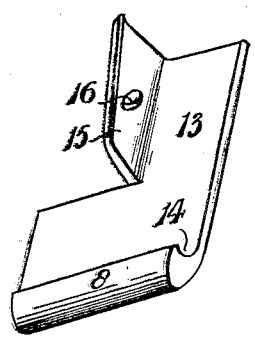
*Fig.7.*
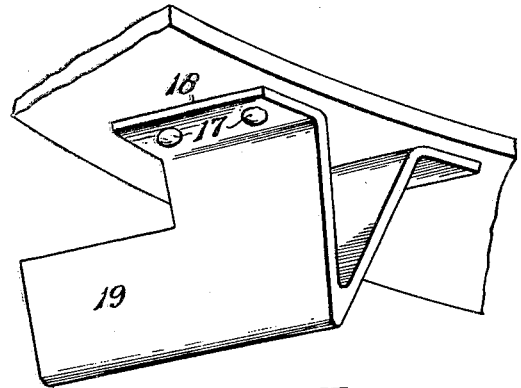
*Fig.8.*
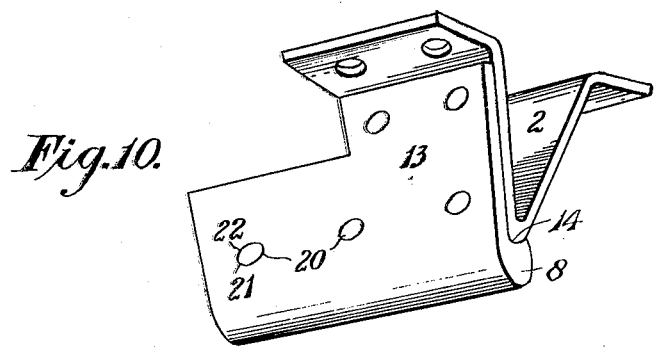
*Fig.10.*
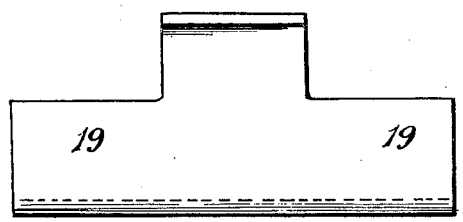
*Fig.9.*
INVENTOR
L. F. MORONEY
BY
ATTY Patented Sept. 19, 1933

1,927,132

UNITED STATES PATENT OFFICE 1,927,132

WHEEL GRIP FOR TRACTION WHEELS

Laurence Francis Moroney, Lara, Victoria, Australia

Application June 10, 1932, Serial No. 616,527, and in Australia June 15, 1931

4 Claims. (Cl. 301—44)

This invention relates to improvements in grips for attachment to the wheels of farm tractors or other traction wheels for the purpose of preventing slipping of the wheels when operating in wet or loose soil.

One object of the invention is to provide an improved wheel grip characterized by having an extension on one side thereof, the said extension being adapted to project laterally beyond the edge of the wheel rim for the purpose of increasing the gripping surface.

A further object is to provide a wheel grip designed for attachment over the existing spud grip of a wheel when it has become worn or when it is required to increase the gripping effect according to the condition of the soil in which a tractor is working.

The improved wheel grips having lateral extensions as aforesaid may be provided with renewable wearing plates detachably fitted to them.

Reference is made to the accompanying drawings wherein:

Fig. 7 is a perspective view of the wearing plate removed.

Fig. 8 is a perspective view showing a modified form of grip according to the invention.

Fig. 9 shows a further modified form of grip.

Fig. 10 is a view showing the wearing plate attached to the form of grip shown in Fig. 8.

The form of the improved wheel grip illustrated in Figs. 1 to 6 of the drawings is intended for use in conjunction with the usual spud grip provided on the traction wheel and is constructed for attachment over said spud grip, while the forms of grips shown in Figs. 8 to 10 are intended for direct application to the wheel in lieu of spud grips.

Figure 1:
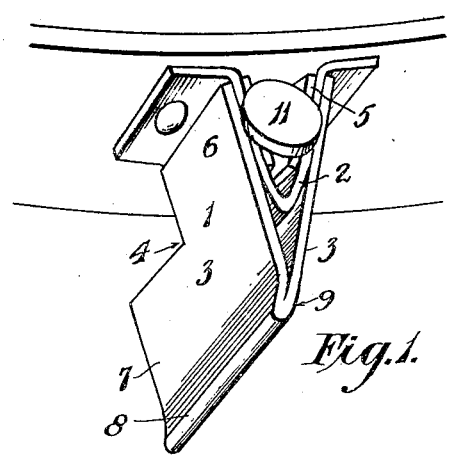
Fig. 1 is a perspective view of one form of the improved grip fitted in position on the wheel.
Figure 3:
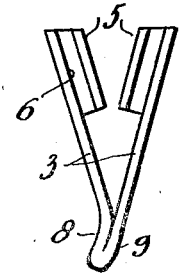
Fig. 3 is an end view.
Figure 2:
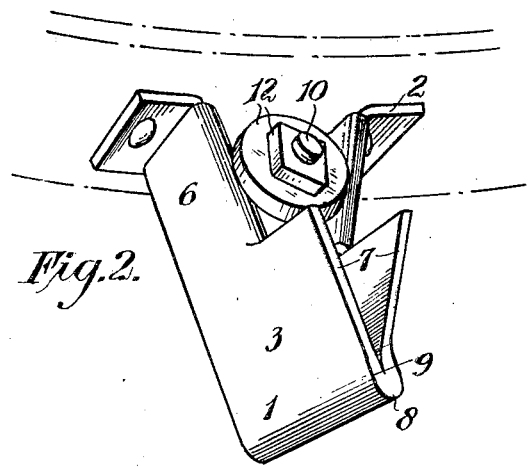
Fig. 2 is a similar view to Fig. 1, but showing the opposite side of the grip.
Figure 4:
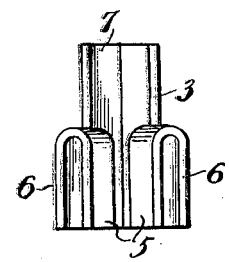
Fig. 4 is a plan view of the grip removed from the wheel.

According to the form of the invention illustrated in Figs. 1 to 3, the improved grip 1 is manufactured from metal plate bent to substantially V-shape to fit closely over the exterior surface of the usual hollow spud grip 2 fitted on the wheel. The wing portions 3 of said V-shaped plate are slitted horizontally as at 4 to provide two lugs or tongues 5, which are bent inwardly and rearwardly upon the adjacent portions 6 of the wings so as to thus fit into the hollow interior of the spud grip when the improved grip is applied thereover. The lower portions 7 of the wings of the grip may be extended laterally any appropriate distance to provide the desired increase of the gripping surface. Preferably, the grips intended to be applied to the outer side of the wheel extend beyond the edge of the wheel rim, while the grips for the inner side of the wheel are of lesser length in order to provide the necessary clearance between the wheel guard.

The outer end portion of the grip may be constructed and shaped to provide a toe or gripping point 8 which may be set at a slight angle or appropriately curved as indicated by 9 to enable the grip to leave the ground cleanly and also to permit a limited creeping action of the grip in the ground during the rotation of the wheel.

In fitting the grip in position, it is slidably applied on to the spud grip 2 from one side thereof so that the wing portions 3 embrace the outer surfaces of said spud grip and the inwardly bent tongues 5 on said wings fit closely against the hollow interior of the spud grip. A bolt 10 is then passed horizontally through the interior of the grip and the central hollow portion of the spud grip 2 to function as additional securing means for the grip. The head 11 of said bolt is preferably enlarged as shown in Fig. 1 or is fitted with a washer to bear against the ends of the grip and spud grip 2, while the other end of said bolt receives a washer and nut 12 which bear against the opposite ends of the grips.

Figure 5:
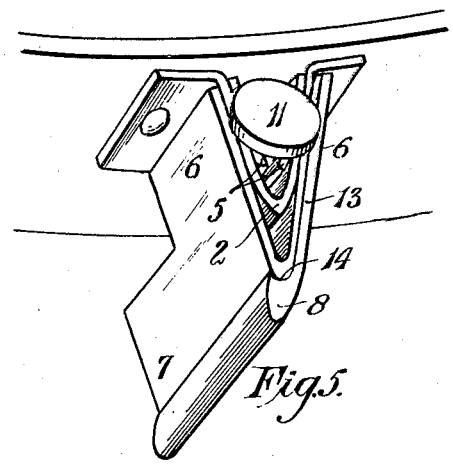
Figs. 5 and 6 are views similar to Figs. 1 and 2, but showing the wearing plate attached to the working face of the grip.
Figure 6:
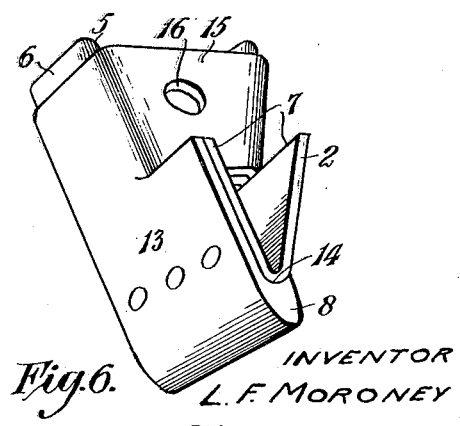

The working face of the improved grip may be fitted with a renewable wearing plate 13, see Figs. 5, 6 and 7, which is constructed to fit closely against the working face of the grip and over its outer end portion. In this construction, the toe or gripping point 8 is formed on the outer end portion of the wearing plate instead of on the grip itself. A suitably shaped shoulder 14 is also formed on the wearing plate 13 above the toe 8 to receive and fit closely over the outer end or point of the grip 1.

The wearing plate is provided on one of its side edges with an inwardly turned lug or tongue 15 which is adapted to fit against the end of the grip adjacent to the inturned tongues 5. Said lug or tongue 15 is provided with a hole 16 which receives the bolt 10 used for securing the grip to the spud grip 2. Countersunk bolts may also be used in addition to the securing tongue 15 to fasten the wearing plate to the grip.

The form of grip illustrated in Fig. 8 of the drawings is designed for use on wheels which have not already been fitted with spud grips. This grip is secured directly to the rim of the wheel by means of one or more bolts 17 passed through apertured lugs 18 on the grip. The grip is of V-shape substantially similar to the usual spud grip, but is characterized by having an extension 19 formed integrally on one side thereof to project laterally beyond the edge of the wheel rim. Said extension is provided at the pointed end portion of the grip and is preferably of V-shape in cross-section corresponding to the shape of the grip.

The laterally extended portion 19 of the wheel grip may be of any desired length to provide the increased gripping surface desired. Preferably, the grips applied to the outer side of the wheel are extended to a considerable distance beyond the edge of the wheel, while the grips on the inner side of the wheel have extensions 19 of lesser length in order to provide the necessary clearance between the wheel guard.

In the form of grip shown in Fig. 9 two lateral extensions 19 are provided, one on each of its opposite sides. In this case the extension on the outer side of the grip may be of greater length than that on the inner side of the grip.

The grips shown in Figs. 8 and 9 may each have the renewable wearing plate 13 fitted to its working face, see Fig. 10. Said wearing plate is substantially similar to that previously described, but it does not have the inwardly turned lug or tongue for securing it to the grip. In contradistinction, said wearing plate is secured directly to the face of the grip by a plurality of bolts 20 which have tapered heads 21 fitted flush into countersunk holes 22.

The improved grip according to the form of the invention shown in Figs. 1 to 6 is intended principally for attachment over spud grips which have become worn, but it may be used with advantage on new or practically new spud grips. The grip greatly increases the gripping surface of the wheel and will be found to positively prevent slippage of the wheel, even when the tractor is working in soft mud or in loose sandy soil. The improved grip will in most cases be found to be wholly self-cleaning as any soil which may adhere to the smooth tapering sides of the grip is effectively dislodged by the subsequent penetration of the grip into the ground. The renewable wearing plate 13 enables the worn surface of the grip to be conveniently replaced at low cost and without removing the grip from the wheel.

The grip and its wearing plate may be manufactured by forging or like operations, or it can be formed from cast steel or the like.

What I do claim is:—

1. In combination with a wheel having a hollow V-shaped spud grip secured thereto, of a wheel grip having a part to overlie and embrace the exterior of the spud grip and a part to overlie and bear against the interior surface of the spud grip, and means passing through the hollow portion of the spud grip and terminally overlying the edges of the spud grip and cooperating portions of the wheel grip to removably secure the wheel grip in position on the spud grip.

2. A wheel grip designed to interfit with and overlie a hollow V-shaped spud grip secured to a wheel, said wheel grip comprising an outer portion overlying the outer surface of the spud grip and an inner portion integral with the outer portion and designed to overlie and bear against the inner surface of the spud grip, the inner portion of the wheel grip being formed by appropriately bending a part of the outer portion of such wheel grip, a bolt passed through the hollow portion of the spud grip, a head on said bolt to overlie and bear against the side edges of the spud grip and the free ends of the inner portion of the wheel grip, and fastening means on the opposite end of the bolt to overlie cooperating portions of the nested grips whereby to removably secure the wheel grip to the spud grip.

3. A wheel grip designed to be fitted over a hollow V-shaped spud grip, said wheel grip comprising a plate bent to substantially V-shape and having wing portions formed in return bends to embrace the respective portions of the spud grip on the inner and outer sides, a gripping toe of curved formation on the free end of the wheel grip, and a securing bolt passed through the hollow interior of the spud grip and cooperating with contacting portions of the spud and wheel grips to prevent separation of the grips.

4. A wheel grip adapted to be fitted over a hollow V-shaped spud grip secured to a wheel, said wheel grip having portions to overlie the outer surfaces of the spud grip, inwardly bent tongues to engage and bear against the interior surfaces of the spud grip, a renewable wear plate fitted to the working face of the wheel grip, a toe at the operative edge of said wear plate, an inwardly turned lug on the wear plate to overlie the side edges of the spud grip, and a bolt cooperating with said lug at one end and with the contacting portions of the spud and wheel grips at the opposite end to removably hold the parts in cooperative relation.

LAURENCE FRANCIS MORONEY.